P. DANCKWARDT.
PROCESS FOR PRODUCTION OF ANHYDROUS ZINC CHLORID.
APPLICATION FILED OCT. 23, 1919.

1,369,729.  
Patented Feb. 22, 1921.

Paul Danckwardt, Inventor

UNITED STATES PATENT OFFICE.

PAUL DANCKWARDT, OF DENVER, COLORADO, ASSIGNOR TO THE DANCKWARDT PROCESS COMPANY, OF DENVER, COLORADO, A CORPORATION OF COLORADO.

PROCESS FOR PRODUCTION OF ANHYDROUS ZINC CHLORID.

1,369,729.  Specification of Letters Patent.  Patented Feb. 22, 1921.

Application filed October 23, 1919. Serial No. 332,826.

*To all whom it may concern:*

Be it known that I, PAUL DANCKWARDT, a citizen of the United States, residing at the city and county of Denver and State of Colorado, have invented certain new and useful Improvements in Processes for Production of Anhydrous Zinc Chlorid; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to manufacture anhydrous zinc chlorid in a cheaper way by utilizing waste products from the oil industry. This waste product is a residue obtained from the treatment of oils with anhydrous aluminum chlorid and contains therein the aluminum chlorid used in the process. This residue may be either in the form of sludge as it is left in the bottom of the still, or in the form of cake, a coky mass remaining after the sludge has been run down as far as to drive out the small amount of oil which it contains.

Briefly, the process consists in mixing and heating the sludge or cake with zinc ore in such proportions that all of the chlorin of the aluminum chlorid will combine with zinc, raising the temperature to such a degree that the zinc chlorid formed is volatilized and condensing the zinc chlorid vapors. Simultaneously, the aluminum combines with oxygen and forms aluminum oxid, which remains with the carbon of the mixture and is ultimately recovered in the form of ash as a by-product after the carbon has been burned off. The process may be carried on with any suitable apparatus, one example of which is shown in the accompanying drawings, in which:

Figure 1:
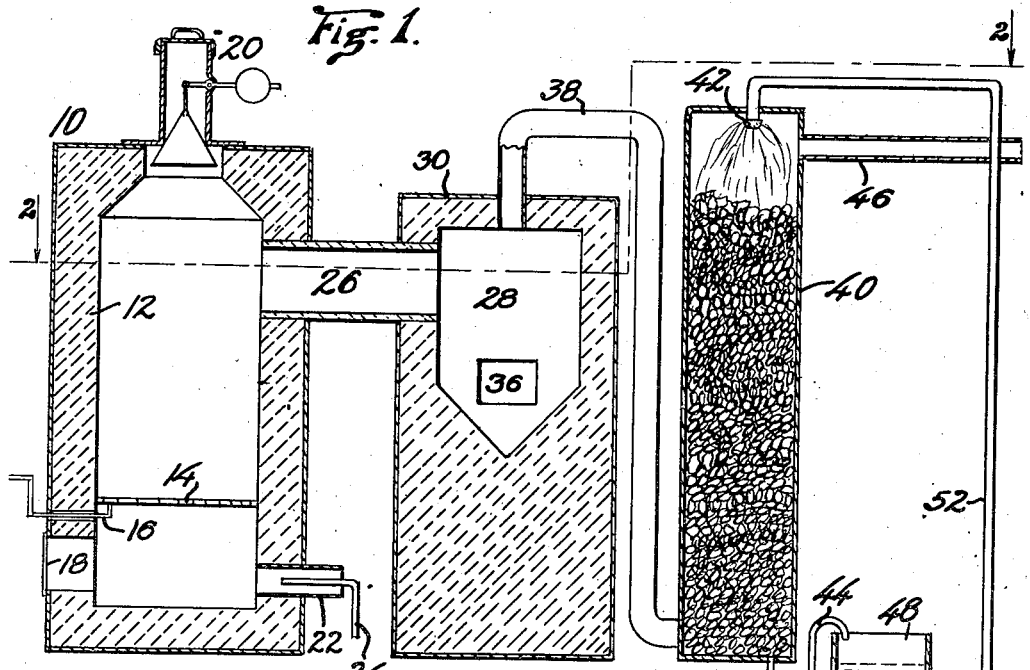
Figure 1 is a vertical section.
Figure 2:
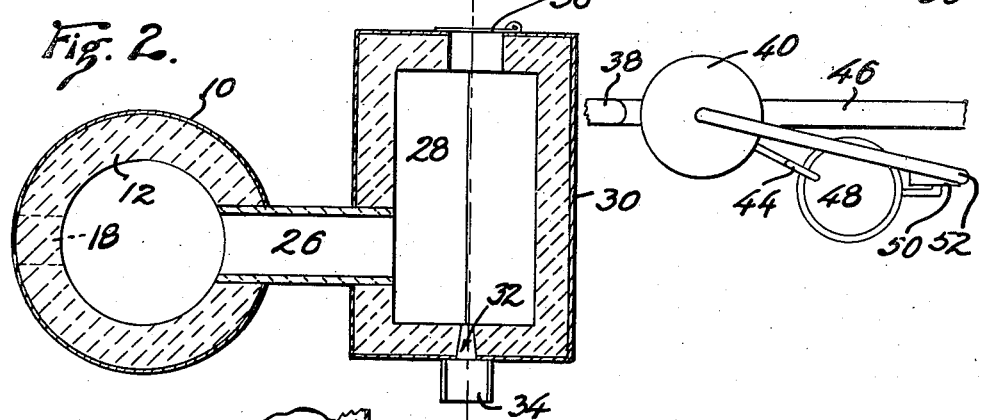
Fig. 2 is a view taken in general on the line 2—2 of Fig. 1.
Figure 3:
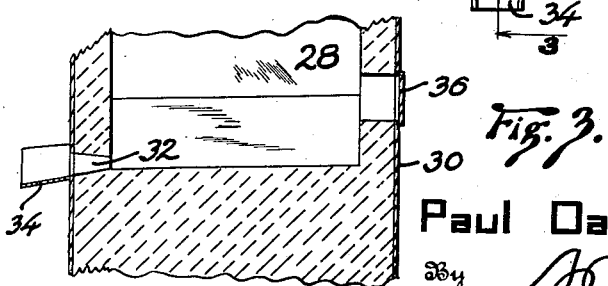
Fig. 3 is a fragmentary vertical section on the line 3—3 of Fig. 2.

A gas producer 10, lined inside with firebrick 12, and supplied with a grate 14 and shaker 16, is equipped with an ash door 18, a feed hopper 20, an air intake 22, and a means 24 for injecting steam. An outlet 26 for vapors communicates with a condensing chamber 28, consisting of brickwork and preferably inclosed in a steel shell 30. The bottom of this condenser is V-shaped and inclined toward the front, where a tap-hole 32 and a spout 34 are provided at the lowermost point. A door 36 is situated at the rear. An outlet pipe 38 for gases leads from the top of the condenser to the bottom of a scrubber 40, which consists of an upright vessel filled with coke. A gooseneck outlet 44 leads from the lower end of the scrubber, and a fluid spray 42 is provided at the upper end. A gas outlet 46 leads from the upper portion of the scrubber. The gooseneck 44 discharges into a tank 48, connected with a circulating pump 50 and conduit 52, which leads the fluid from the tank to the spray 42.

Other apparatus for igniting the mixture might be used instead of the gas producer 10, such, for instance, as a blast furnace. However, the gas producer is advantageous in view of the gas formed as a by-product.

In carrying on the process in the apparatus shown, the process is started by using some kindling material on the grate to ignite the residue above described. The residue preferably should be entirely or at least partly briqueted before being added. A current of air is passed through the pipe 22 and into the material on the grate.

At a low temperature the reaction between the oil residue and the zinc ore commences, but it requires a red heat to drive off the zinc chlorid into the condenser. As the residue contains considerably more carbon than is required for the process, the temperature would become unnecessarily high before all the carbon was burned off. Therefore the temperature is maintained in the condenser 28 so as to keep the condensed zinc chlorid therein in the molten state, but not so high as to drive more than traces of zinc chlorid over into the scrubber 40. To accomplish this result and at the same time to burn off all the carbon, which is necessary in order to produce an ash containing nearly pure aluminum oxid, a current of steam is introduced through the pipe 24 as soon as the temperature rises beyond that required, the steam being in such quantity as will keep the temperature at the desired point. This would ordinarily prolong the heating beyond the time required for the expulsion of the zinc chlorid formed, but as new mixture is from time to time introduced through the hopper 20, the process of volatilization goes on simultaneously with the combustion of the carbon. The lowering of the temperature by means of steam will produce a large amount of gas high in hydrogen, and this will increase the value of the gas which is formed as a by-product and may be utilized as desired. As this large amount of gas is apt to carry fumes or vapors of zinc chlorid along mechanically beyond the condenser, these vapors are removed by the fluid, which is sprayed over the coke in the condenser. This fluid at the start is water, but it gradually becomes saturated with the zinc chlorid absorbed during the scrubbing process. When saturated, the liquid is withdrawn from the collecting tank 48 and replaced by fresh water. The saturated zinc chlorid solution is then evaporated and will yield by fusion anhydrous zinc chlorid. However, by far the greater part of zinc chlorid is withdrawn from the condensing chamber 28 in the molten state, it being run into molds. If not used immediately, it should be packed well in order to prevent deliquescence. The process thus yields directly in one operation fused anhydrous zinc chlorid without the use of much apparatus. When the addition of fresh mixture of oil residue and zinc ore is stopped, the sublimation of zinc chlorid will soon stop also. From that time on only gas is formed and expelled and when all the carbon has been burned off, only ash, consisting of more or less pure aluminum oxid is left behind. This will be deposited below the grate and removed through the door 18. This aluminum oxid forms a valuable by-product and the cleaner the zinc ore is which has been used for the process, the cleaner will be the aluminum oxid. As a suitable zinc ore, oxid, carbonate or roasted sulfid is recommended; raw sulfid is less desirable, as chlorid of aluminum does not seem to react with it easily, and free sulfur will go over with the gas, rendering it less valuable. Other zinc compounds than ore can be used.

The chemical reactions taking place may be expressed as follows:

$$Al_2Cl_6 + 3ZnO = Al_2O_3 + 3ZnCl_2$$
$$C + O = CO$$

and $$C + H_2O = CO + 2H;$$

and in the case of the carbonate:

$$Al_2Cl_6 + 3ZnCO_3 = Al_2O_3 + 3ZnCl_2 + 3CO_2$$

and $$CO_2 + C = 2CO;$$
$$C + O = CO;$$
$$C + H_2O = CO + 2H.$$

If the sulfid is used:

$$Al_2Cl_6 + 3ZnS = Al_2S_3 + 3ZnCl_2$$

and $$Al_2S_3 + 9O = Al_2O_3 + 3SO_2$$
$$SO_2 + 2C = S + 2CO;$$
$$C + O = CO;$$
$$C + H_2O = CO + 2H.$$

It may be that $Al_2S_3$ is not at all formed as an intermediary product, but that the oxygen introduced with the air takes part directly and acts on the sulfid of zinc, forming zinc oxid which then reacts with the aluminum chlorid, while the sulfurous acid formed at the same time is reduced by carbon to the elemental state. The above reactions express, however, the fact that sulfur is set free and the end products are aluminum oxid and zinc chlorid.

In making up the mixture of residue and zinc ore, the quantity of ore to be added must be calculated from the aluminum chlorid content of the residue, and that of the ore from its zinc oxid content or its equivalent in carbonate or sulfid, using the above reactions as the basis of computation. For instance, in the case of pure roasted zinc ore, consisting practically of pure zinc oxid, 244 pounds of zinc ore must be added for every 125 pounds of aluminum chlorid contained in the residue. Impurities, when present in not too great an amount, will not affect the reactions, but may reduce the value and purity of both the zinc chlorid and the aluminum oxid according to their character.

I claim:

1. The process of producing anhydrous zinc chlorid, which consists in heating a mixture of aluminum chlorid, carbon and zinc ore gradually to such a temperature that the zinc chlorid formed is volatilized, and condensing same.

2. The process of producing anhydrous zinc chlorid which consists in heating a substance containing aluminum chlorid and carbon and a substance containing zinc, thereby forming zinc chlorid, volatilizing the same and condensing it.

3. The process of producing anhydrous zinc chlorid which consists in heating oil residues containing aluminum chlorid, and zinc ore, to such a temperature as to volatilize the zinc chlorid formed and condensing the same.

4. The process of producing anhydrous zinc chlorid which consists in heating residues obtained from the treatment of oils with aluminum chlorid and zinc ore so that the zinc will combine with the chlorin of the aluminum chlorid and the oxygen of the zinc ore with the aluminum, increasing the temperature until all the zinc chlorid is driven out, and condensing the latter.

5. The process of producing anhydrous zinc chlorid which consists in heating a mixture of residues obtained from the treatment of oils with aluminum chlorid, and a zinc compound, and condensing the vapors of zinc chlorid formed.

6. The process of producing anhydrous zinc chlorid which consists in heating a mixture of residues obtained from the treatment of oils with aluminum chlorid, and a substance containing zinc oxid, sufficiently to drive out all the zinc chlorid and condensing the same.

7. The process of producing anhydrous zinc chlorid which consists in heating residues obtained from the treatment of oils with aluminum chlorid, mixed with such an amount of zinc-carrying material that all the chlorin of the aluminum chlorid can combine with zinc, continuing the heating until all the zinc chlorid formed is volatilized, and condensing the latter.

8. The process of producing anhydrous zinc chlorid which consists in blowing air through a mixture of oil residues containing aluminum chlorid, and a zinc compound previously ignited, thereby causing combustion of the carbon to take place and the generation of enough heat to volatilize the zinc chlorid formed, and condensing the same.

9. The process of producing anhydrous zinc chlorid which consists in igniting a mixture of oil resdues containing aluminum chlorid, and a substance containing zinc oxid, maintaining the combustion by blowing air and vapors containing oxygen through the mixture until all the carbon is burned off, the zinc chlorid formed is volatilized, and an ash is produced consisting mainly of aluminum oxid, and condensing the zinc chlorid.

10. The process of producing anhydrous zinc chlorid which consists in igniting a mixture of oil residues containing aluminum chlorid, and a substance containing zinc, maintaining combustion by passing air and steam through the mass until all the carbon is removed as fixed gas, condensing the zinc chlorid vapor expelled with the gas, holding the condensed zinc chlorid in liquid form, and recovering the aluminum in the form of oxid in the remaining ash.

In testimony whereof I affix my signature.

PAUL DANCKWARDT.